(12) United States Patent
Bates et al.

(10) Patent No.: US 6,809,741 B1
(45) Date of Patent: Oct. 26, 2004

(54) AUTOMATIC COLOR CONTRAST ADJUSTER

(75) Inventors: Cary Lee Bates, Rochester, MN (US); Paul Reuben Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 600 days.

(21) Appl. No.: 09/329,135

(22) Filed: Jun. 9, 1999

(51) Int. Cl.[7] ................................. G09G 5/02
(52) U.S. Cl. ..................... 345/597; 345/617
(58) Field of Search ................ 345/114, 150, 345/596, 597, 593, 617, 640, 683, 795, FOR 137, FOR 169, FOR 212; 707/528

(56) References Cited

FOREIGN PATENT DOCUMENTS

| JP | 02-027369 | 1/1990 |
|---|---|---|
| JP | 02-026877 | 2/1990 |
| JP | 04-051668 | 2/1992 |
| JP | 05-073249 | 3/1993 |
| JP | 09-134159 | 5/1997 |
| JP | 09-149276 | 6/1997 |
| JP | 09-284534 | 10/1997 |
| JP | 10-138567 | 5/1998 |
| JP | 11-065547 | 3/1999 |

OTHER PUBLICATIONS

Mastering Windows 3.1 Special Edition, Robert Cowart, 1993, Sybex, p. 154–157.*
Running A Perfect Netscape Site, Bill Kirkner, 1996, Que, p. 400–405.*

\* cited by examiner

Primary Examiner—Matthew C. Bella
Assistant Examiner—Greg Cunningham
(74) Attorney, Agent, or Firm—Schmeiser, Olson & Watts; Steven W. Roth

(57) ABSTRACT

A color contrast adjuster is disclosed that automatically selects and applies a new color combination for text and background based on the current color combination for the text and background, if the current color combination is a problem color combination. The text can be any text object (such as a hypertext link, bold text, underline text, groups of text etc.) and the background can be any background object whose color can be determined (such as a solid color, a button, a global interchange format file, etc.). Additionally, the color contrast adjuster can store multiple problem and preferred color combinations for each user. The color contrast adjuster can replace a problem color combination with a preferred color combination. Furthermore, the color contrast adjuster can provide example color combinations to a user, allow the user to select a better color combination, and add this preferred and problem combination to a user preferences. This allows the color contrast adjuster to adapt to additional problem color combinations. The color contrast adjuster can also provide the user with an indication of previous colors for objects whose color has been changed. This option is useful if the user is to select an object based on the color of the object.

35 Claims, 9 Drawing Sheets

| | Problem Color Combination | | | | | | | Preferred Color Combination | | |
|---|---|---|---|---|---|---|---|---|---|---|
| | Background object | | | | | | Text Object | Background object | Text object |
| Name | R | G | B | ΔR | ΔG | ΔB | Name | Name | Name |
| yellow-green | 150 | 150 | 112 | 10 | 10 | 5 | darker-blue | light gray | |
| | | | | | | | black | light gray | |
| darker-blue | 0 | 0 | 156 | 50 | 50 | 20 | yellow-green | light gray | black |
| | 35 | 35 | 142 | 30 | 30 | 20 | | | |
| | 50 | 50 | 205 | 30 | 30 | 25 | red | light gray | black |
| red | 255 | 0 | 0 | 20 | 50 | 50 | black | | white |
| | | | | | | | yellow | light gray | black |
| black | 0 | 0 | 0 | 50 | 50 | 50 | yellow-green | | white |
| | | | | | | | orange-red | | black |
| light gray | 230 | 230 | 250 | 5 | 5 | 20 | yellow | | black |
| | | | | | | | red | | black |
| orange-red | 150 | 50 | 50 | 10 | 10 | 10 | yellow | light gray | black |
| | | | | | | | black | light gray | |

| Default | Background: light gray | Text objects: | Text: Black | Links: Unvisited | Links: Visited | Bold | Italics |
|---|---|---|---|---|---|---|---|
| | | | | black | black | red | red |

| Name | Object | |
|---|---|---|
| Name | Object | |
| yellow-green | Table_background_1 | } 740 |
| maroon | Links_1 | } 750 |
|  | Gif_file_Name_1 | } 760 |
| darker blue | Table_background_2 | } 770 |
| red | Text_1 | } 775 |
| red | Text_2 | } 777 |
| yellow-green | Text_3 | } 780 |

710 spans the Name column; 720 spans the Object column.

FIG. 8

AUTOMATIC COLOR CONTRAST ADJUSTER

BACKGROUND OF THE INVENTION

1. Technical Field

This invention generally relates to changing colors of objects. More specifically, this invention relates to changing color combinations of text and background objects to enhance the color contrast of these objects.

2. Background Art

Computers in the home have been a boon to many people, as computers allow their owners to write letters, store recipes, calculate finances, keep a checkbook, and communicate with other computer users. Computers in the workplace not only allow the previously mentioned benefits, but also allow almost instant collaboration between workers, fast file and data transfers, and real-time video conferencing.

While the use of computers has brought great benefits to many people, there are still some problems associated with computer use for particular people. In particular, some people have a hard time discerning text when the text is on a colored background. This problem is exacerbated when the text, in addition to the colored background, is a non-standard color. For many applications, any person who cannot determine text on a particular background may simply change the combination of colors for the text and the background.

However, with today's instantaneous collaboration, the color contrast between text and its background is becoming more problematic. Many products, such as workgroup collaboration programs (sometimes called "groupware") and browser environments, allow the designer to select the color combination of the background and the text. In this system, a designer might select, for instance, black text with red italics on a yellow background. This color combination may make it hard for those who are visually impaired or color blind to read the message. As another example, a designer might choose yellow text on a background image of leaves that has quite a bit of black and green in it. Even people without any visual impairment may have a hard time reading this text.

These color contrast problems are particularly egregious for web browsers viewing web pages from the internet. Because the internet is essentially a very large network of discrete computers, web page programmers are free to choose any background and text color combination that they desire. There are no "standard" background and text combinations on the internet. Additionally, multicolored backgrounds or background images are becoming increasingly popular. Background images, in particular, can make the overlying text very hard to read, as the image can contain areas of color that distract the eyes from the text, collide with the text, or blend with the text. Some internet users, particularly those with visual impairments, have a hard time discerning text from the staggering number of web pages that have some type of color contrast problem for these users.

For users who experience problems with reading text on certain web pages, or who have troubles reading messages sent using collaboration or groupware tools, there are some options. Some collaboration tools and internet browsers allow the user to override the current background and/or text color. Additionally, some browsers will simply replace all backgrounds and text colors to the user's preferences by using a style sheet. These settings allow a user to adapt the wide variety of web page color combinations to something more suitable for the user.

These solutions have their limitations, however. If only the text is changed to the user's preferences, then the text might be changed from yellow to black, for instance, when the current background is black. This change would make the text unreadable. Similarly, if all backgrounds are changed to a user preference of white, then the color combination of yellow text on what was previously a black background would now become the combination of yellow text on a white background. If all color combinations are changed to a user preference color combination, then other anomalies can arise. For example, some web pages have frames where the only demarcation that separates the frames are differences in color between the frames. Replacing each of these frame background colors with a user preference color eliminates the demarcations between frames.

The "style sheet" solution is also a limited solution to color contrast problems because many web pages do not contain style sheets. By having a user select his or her own style sheet, the browser can then use this style sheet to replace the style sheets of web pages. Because few web pages use style sheets, the browser primarily changes the text and background color combination. This change in color combination has its own detriments, as discussed above.

Finally, these solutions tend to eviscerate any creative flair placed into the web page by the web page designer, as these solutions simply replace the web page's color combinations with the user's sole color combination.

Without a method and apparatus for automatically improving color contrast between text and backgrounds, many users of computer systems will be frustrated in their attempts to read text in certain text and background color combinations, and will continue to experience text and/or background color changes that may actually make the text less readable or that make all text and background color combinations the same.

BRIEF SUMMARY OF INVENTION

The preferred embodiments of the present invention provide a color contrast adjuster that automatically selects and applies a new color combination for text and background based on the current color combination for the text and background, if the current color combination is a problem color combination. The text can be any text object (such as a hypertext link, bold text, underline text, groups of text etc.) and the background can be any background object whose color can be determined (such as a solid color, a button, a global interchange format file, etc.). Additionally, the color contrast adjuster can store multiple problem and preferred color combinations for each user. The color contrast adjuster can replace a problem color combination with a preferred color combination. Furthermore, the color contrast adjuster can provide example color combinations to a user, allow the user to select a better color combination, and add this preferred and problem combination to a user preferences. This allows the color contrast adjuster to adapt to additional problem color combinations. The color contrast adjuster can also provide the user with an indication of previous colors for objects whose color has been changed. This option is useful if the user is to select an object based on the color of the object.

Because the color contrast adjuster preferably changes color combinations on a background-by-background basis instead of changing all backgrounds to one color, there should be less interference with the layout of web pages or other documents. Additionally, the color contrast adjuster's use of a user preferences gives a user more control over the layout of web pages or other documents. This allows the user to minimize the effect of the color contrast adjuster to the extent that the user wishes to control this effect.

The foregoing and other features and advantages of the present invention will be apparent from the following more particular description of the various preferred embodiments of the invention, as illustrated in the accompanying drawings.

BRIEF DESCRIPTION OF DRAWINGS

The preferred exemplary embodiments of the present invention will hereinafter be described in conjunction with the appended drawings, wherein like designations denote like elements, and:

FIG. 7 is an example of a user preferences shown in accordance with a preferred embodiment of the present invention;

FIG. 8 is an example of a changed color storage shown in accordance with a preferred embodiment of the present invention.

DETAILED DESCRIPTION OF INVENTION

Figure 1:
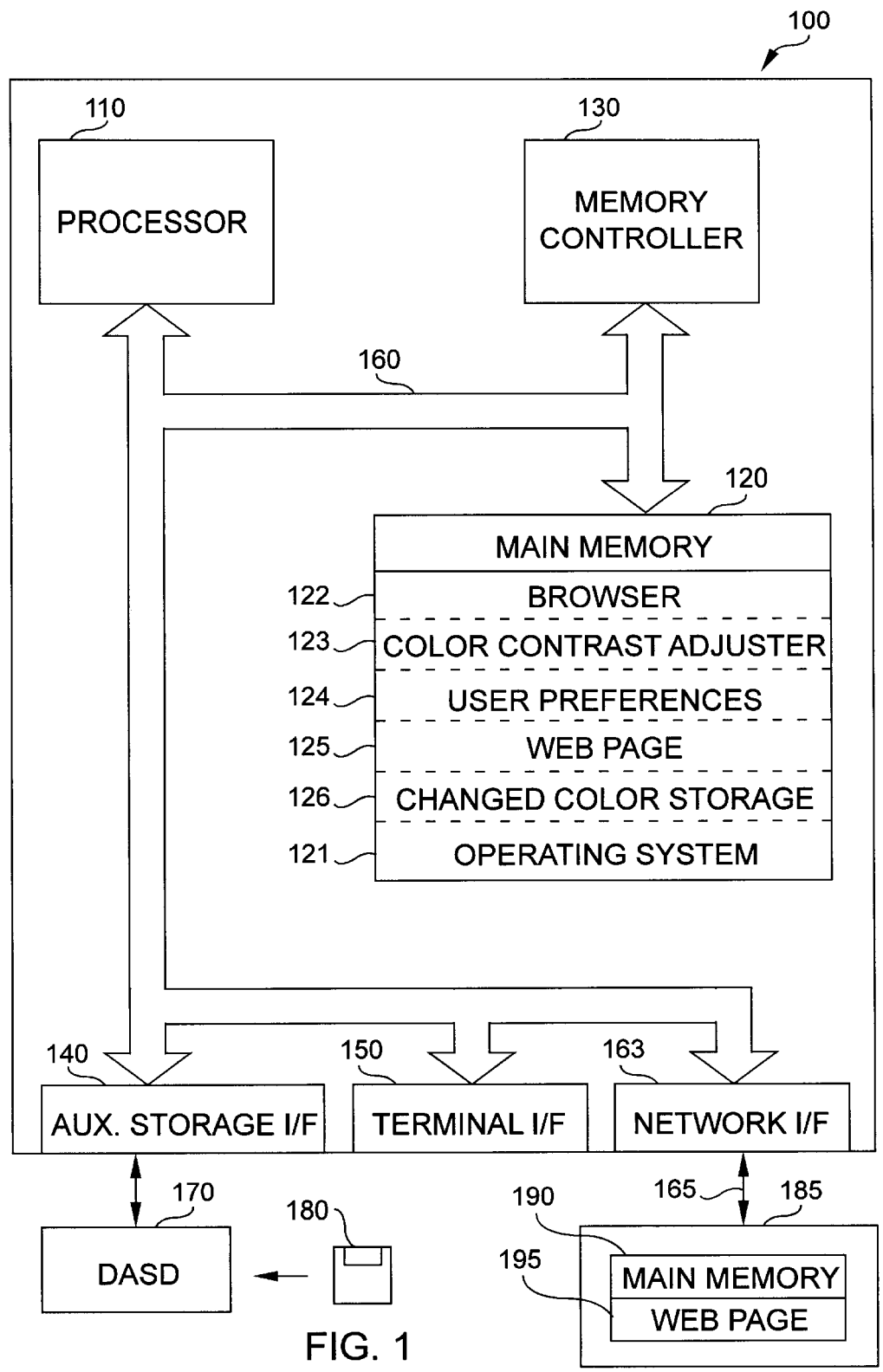
FIG. 1 is a computer system configured in accordance with a preferred embodiment of the present invention.

The preferred embodiments of the present invention provide a color contrast adjuster that automatically selects and applies a color combination for text and background objects based on the current color combination for the text and background objects. Note that the term "color combination" refers to the combination of colors of a background object and a text object. If the background is multicolored, one of the colors of the background object and the color of the text object comprise the color combination. The color contrast adjuster preferably compares the current color combination with a multitude of problem color combinations stored in a user preferences. If the color contrast adjuster finds a match between the current color combination and one of the problem color combinations, the color contrast adjuster applies the preferred color combination corresponding to the matched particular problem color combination. Because of the incredible number of colors, a "match" will generally be determined by comparing a range of colors for each of the colors comprising each of the problem color combinations with the one current color combination. The user preferably selects the range of colors for each color of a problem color combination, although initial problem color combinations and color ranges therefore will usually be provided. If the color contrast adjuster does not find a match, it leaves the color combination as is unless the user indicates that this is a problem color combination. In the latter instance, the color contrast adjuster can provide the user with example color combinations, allow the user to select a preferred color combination, and save this new preferred color combination and its corresponding problem color combination in user preferences.

Additionally, the color contrast adjuster preferably saves the name of the color and the object's location for objects whose colors have been changed. This allows the color contrast adjuster to display the name of an object whose color has been changed. This can be helpful in those situations when determination of the color is important for some reason, such as if a web page asks a user to press the red continue button (whose color is now white).

In general, there will be more than one text object on or surrounded by a background. In this case, each text object will be compared with the background to determine if there is a color contrast problem. If a color contrast problem is found, the text and/or background colors are changed as per user preferences. If there are multiple color problems between the plurality of text objects on a background and the background, a default color combination can be used to prevent multiple changes in color combinations. If the background is multicolored, the color contrast adjuster will preferably determine, usually with a weighting calculation, the top few colors in the multicolored background. The number of colors is preferably determined by user preferences. Each of these colors is then compared against the text objects' colors to determine color contrast problems. If there is a multitude of color contrast problems, the color contrast adjuster will usually use a default color combination to prevent multiple changes in color combinations.

Referring now to FIG. 1, a computer system 100 in accordance with a preferred embodiment of the present invention is a single processor computer system. However, those skilled in the art will appreciate that the methods and apparatuses of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, a terminal interface 150, and a network interface 163, all of which are interconnected via a system bus 160. Computer system 100 in this example is connected to another computer 185 through network 165. This computer 185 has a main memory 190 containing a web page 195. Other portions of computer system 185 are not displayed for simplicity. Note that various modifications, additions, or deletions may be made to computer system 100 illustrated in FIG. 1 within the scope of the present invention. For instance, another network interface could be added that connects computer 100 to another network. FIG. 1 is presented to simply illustrate some of the salient features of computer system 100.

Processor 110 of computer system 100 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 may also be any number of separate processors. Processor 110 suitably executes an operating system 121 within main memory 120. Operating system 121 can be any operating system able to run an application, such as Unix, Linux, OS/2, WINDOWS CE, WINDOWS 95 or 98, etc. Operating system 121 controls the basic functions of computer system 100.

Memory controller 130 is responsible for control signals to move, store, and retrieve requested data from main memory 120 and/or through auxiliary storage interface 140 to processor 110. While, for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Preferably running with and being controlled by operating system 121 are a browser 122, a color contrast adjuster 123, a user preferences 124, a web page 125, and a changed color storage 126. Although the current invention is beneficial any time that color contrast of text and background can be automatically adjusted, the current invention probably has its best application in the area of web pages, as there are so no standards for web pages. As such, the current invention will be discussed in regard to web pages shown on a web browser, such as browser 122.

Browser 122 is currently displaying a web page 125, which is a local copy of web page 195. Browser 122 received this copy of the web page from computer system 185, which is a remote computer system. Color contrast adjuster 123 examines the web page for text objects that are on top of or surrounded by a background object. Alternatively, color contrast adjuster 123 examines web page 125 for a background object, then finds text objects that are within the physical confines of the image of the background object. Because the color contrast adjuster works with browser 122, it is preferred that the color contrast adjuster be a plug-in for the browser or be built into the browser.

When determining if there is a color contrast problem for color combinations of text and background objects, the color contrast adjuster accesses user preferences 124. User preferences 124 contains a multitude of problem color combinations and preferred color combinations (both not shown in FIG. 1). It is preferred that there be one preferred color combination for each problem color combination. A preferred user preferences is explained in more detail with reference to FIG. 7. Color contrast adjuster 123 compares the current color combination of the text and background objects being examined with problem color combinations in user preferences 124. If a match is found, the preferred color combination corresponding to the current color combination is selected by the color contrast adjuster. The color contrast adjuster then applies the selected color combination. If there are multiple colors in the background or multiple text objects on the background, multiple contrast problems between text and background could occur. In the case of multiple contrast problems, the color contrast adjuster can resort to a default color combination for each text object and background. This is explained in more detail later.

Changed color storage 126 is a location used to store objects whose colors have changed, and some indication of the previous color. For instance, if a hypertext link has been changed from red to black, color contrast adjuster 123 will store a reference to the object (the hypertext link) and the name for the color (e.g., "red"). This allows the color contrast adjuster to determine the location of the object and the previous color of the object, so that the color contrast adjuster can inform the user of the previous color. A preferred changed color storage will be shown and described in reference to FIG. 8.

Although described FIG. 1 as being separate, color contrast adjuster 123, user preferences 124, and changed color storage 126 may be combined into one program. Additionally, each or all of these could be combined into web browser 122.

Auxiliary storage interface 140 of FIG. 1 allows computer 100 to store and retrieve criteria from auxiliary storage devices, such as a magnetic disk (e.g., hard disks or floppy diskettes) or optical storage-devices (e.g., CD-ROM). One suitable storage device is a direct access storage device (DASD) 170. As shown in FIG. 1, DASD 170 may be a floppy disk drive which may read programs and data from a floppy disk 180.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks (e.g., disk 180) and CD ROMS, and transmission type media such as digital and analog communication links, including wireless communication links.

Terminal interface 150 is an interface that allows external devices, such as mice, monitors, keyboards, etc. to be connected to client 100 and that allows human interface with client 100. Although shown as one block, those skilled in the art will realize that many different components may actually make up terminal interface 150.

Network interface 163 is an interface that allows access to web pages and allows collaboration between computers and their users. This interface could be any computer network known to those skilled in the art, using any communications protocol known to those skilled in the art. In general, network interface 163 will be used to access web pages over the internet or in an intranet.

Figure 2:
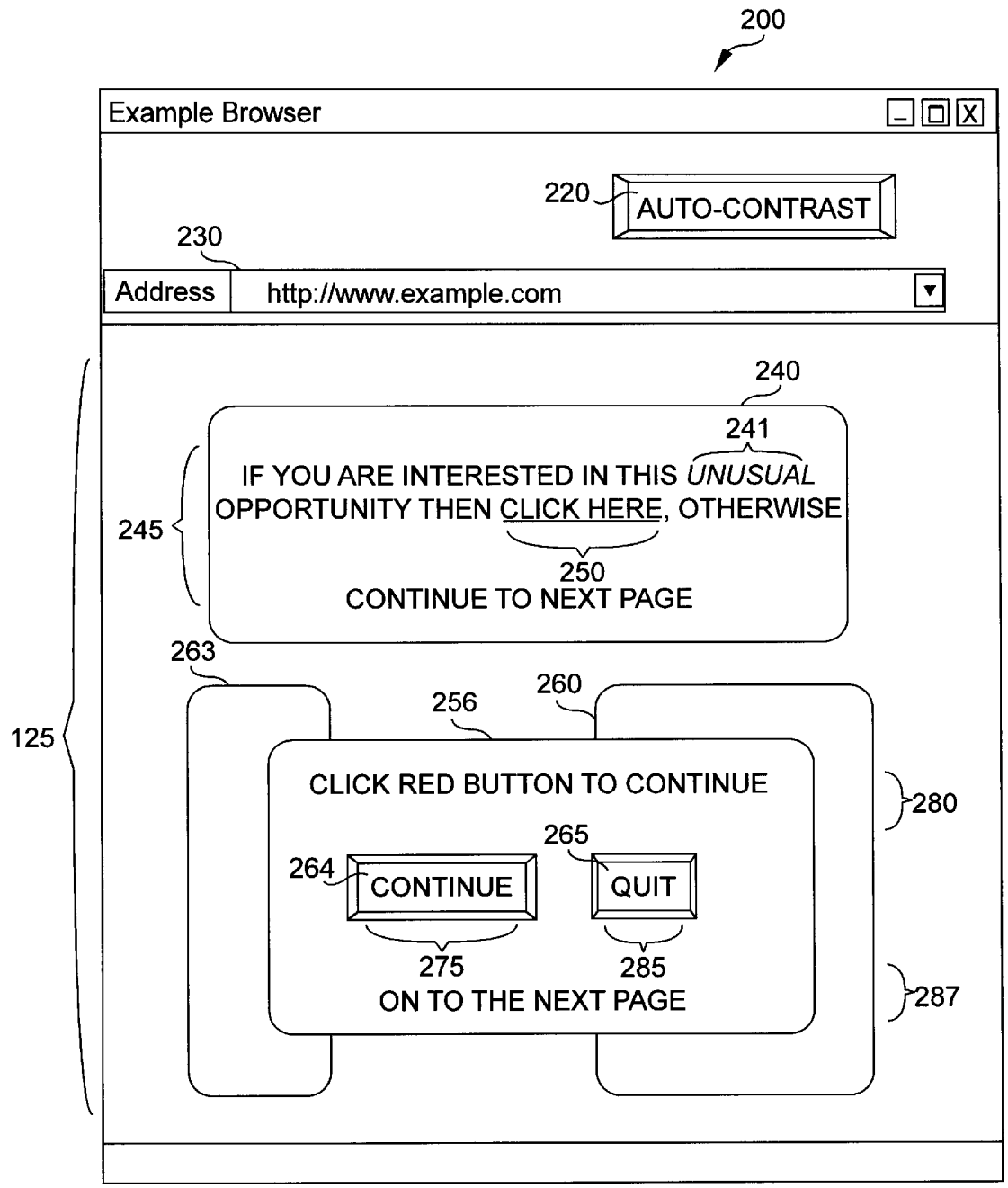
FIG. 2 is an example of a web page being shown by browser.

Turning now to FIG. 2, an example web page 125, as displayed by browser 122 and indicated to the user as browser interface 200, is shown. Example browser interface 200 comprises an auto-contrast button 220, an example address 230 that indicates the current internet uniform resource location (URL), and a web page 125. For simplicity, FIG. 2 does not show many of the other elements of a normal browser, such as other buttons or toolbars, status indicators, etc. Auto-contrast button 220 allows a user to tell the color contrast adjuster that he or she has a problem with color contrast on the current web page. The color contrast adjuster then allows the user to select the problem color combination or combinations, and provides the user with additional color combinations for the problem color combination. After the user selects a better color combination, this new preferred color combination is stored in user preferences. The auto-contrast button and the color contrast adjuster's response to the button is discussed in more detail in reference to FIG. 9.

Web page 125 comprises a plurality of background and foreground objects. Background 240 has a centered foreground text object 245. The present invention is applicable to any text object on a background. The term "text object" is meant to encompass any text (including foreign language text) that can be colored, such as hypertext links, bold text, blinking text, italicized text, etc. As those skilled in the art know, many of these text objects can be grouped. For instance, HTML supports paragraphs wherein the text in a paragraph may be colored. The term "text object" is also meant to encompass groups of text. The term "background object" is meant to encompass any non-text object that can color a portion of a browser's view window. Background objects, generally, will be global interchange format (GIF) files, joint photograph expert group (JPEG) files, general hypertext solid backgrounds, table backgrounds, buttons, etc.

In FIG. 2, there is a background object 240 that is a table background. On this background is a centered text object 245. This is one centered text paragraph, with new line operators that separate the lines. Within this text object are two other text objects, a hyperlink 250 and an italicized portion 241. Even though these objects are part of one hypertext paragraph, they will preferably be treated as separate objects as they can each be assigned a color. Background object 263 is a GIF file that is behind a foreground object 256. Background object 260 also is behind foreground object 256 and is a GIF file similar to GIF file 263. Foreground object 256 is a background object for text 280 and 287, and buttons 264 and 265. Buttons 264 and 265 are themselves background objects for text 275 and 285, respectively.

Turning now to FIG. 7, FIG. 7 contains a portion of a preferred user preferences. User preferences 124 has a plurality of problem color combinations 610 and preferred color-combinations 605. In addition, there is also a default set of color combinations 607 that indicate preferred default colors for background and text objects. The default set of color combinations could be used at all times, should the user request this, but generally will be used when there are multiple background changes due to multiple problem color combinations between text objects and a current background object. This will be described in more detail below.

Each problem color configuration comprises a background object color 615 and a text object color 620. Similarly, each preferred color configuration comprises a background object color 625 and a text object color 630. There are a number of example color combination entries 635 through 670 that each comprise a problem color combination 610 and a preferred color combination 605. Each named background object color 615 has three numbers for the amount of red, green, and blue that make the color. These numbers describe this color in a format well known to those skilled in the art. Each number can vary from zero to 255 (zero to FF in hexadecimal). These numbers correspond to the output that drives each of the colors in a standard computer monitor. In HTML, these numbers are generally grouped together as a six digit hexadecimal number. For instance, 000000 indicates the color black, while FFFFFF indicates the color white.

Using this system, there are over 16 million color combinations. Because of the multitude of color combinations and the way the human eye views colors, each background object color 615 will generally have a multitude of different number combinations that are similar enough to be grouped into a named color. For instance, color combination entry 640 is named "darker-blue." In this example, there are three colors that are similar enough to be called "darker-blue." These colors are the following: zero red, zero green, 156 blue; 35 red, 35 green, and 142 blue; and 50 red, 50 blue, and 205 green. In general, there will be many more colors that fit into each one of the named background object colors. Only some example colors are shown in user preferences 124 to make the size of the table manageable.

Each background object color 635 through 670 preferably contains not only the name and red, green, and blue color indication, but also a red, green, and blue change indication. Each change indication corresponds to the maximum amount the red, green and/or blue can change without changing the named color. The change indication essentially allows a range of colors that are grouped into one named color. For instance, in background object color 615 of color combination entry 635, the color can change from 140 red, 140 green, and 107 blue to 160 red, 160 green, and 117 blue and still fall under the named color, "yellow-green." Note that values below zero or above 255 are limited by these numbers. For example, in the uppermost entry in background object color 615 of color combination entry 640, the color can change from zero red, zero green, and 136 blue to 50 red, 50 green, and 176 blue. Negative numbers or numbers above 255 are not defined and should not be used. When using hexadecimal, the numbers for red, green, and blue are to be treated as positive numbers.

For a named background object color, there will generally be at least one and perhaps many problem text colors. For instance, in color combination entry 635, there are two text objects 620 that create a color contrast problem, darker-blue and black. The color combination of a yellow-green background and a darker-blue text object is a problem color combination. Similarly, the color combination of a yellow-green background and a black text object is a problem color combination. In entry 640, there are two problem color combinations: a darker-blue background and a yellow-green text object; and a darker-blue background and a red text object. Note that any of the three colors listed for background object color 640 are interchangeable and indicate the color "darker-blue."

For each of these problem color combinations 610, there is a preferred color combination 605. For the problem color combination of a yellow green background object and black text object (as indicated by entry 635), there is a preferred color combination of a light gray background object 625 and a black text object 630. Note that, in the example of FIG. 7, a blank field in either background object color 625 or text object color 630 indicates that background object color 615 or the text color 620, respectively, is the color for that object. Alternatively, if the background or text will not change between the problem and the preferred color combinations, the background or text color could be copied into the preferred color combinations. For instance, in entry 635, the text object color 620 of black could be copied into the preferred text object color 630 as "black."

For the problem color combination of a darker-blue background object 615 and a yellow-green text object 620 (as indicated by entry 640), the user has indicated that he or she prefers a light gray background object 625 and a black text object 630. When the color contrast adjuster encounters a color combination of a darker-blue background with a yellow-green text object, the color contrast adjuster will apply the preferred color combination of light gray and black by changing the color of the background object to light gray and the color of the text object to black. This is discussed in more detail below.

The names of the colors in the entries in the user preferences will generally be predetermined. However, the user can override these predetermined names or add additional names if desired. In general, it should not be necessary to repeat the red, green, and blue color indications for text object colors 620 and 630 and background object color 625, as there should be colors in background object color 615 that can correspond to the colors in text object colors 620 and 630 and background object color 625. For instance, text object color 620 in entry 635 of "darker-blue" is entered in background object color 615 of entry 640. Similarly, text object color 620 of black (in entry 635) is entered in background object color 615 of entry 670. Thus, the color contrast adjuster should be able to find any color in text object colors 620 and 630 and background object color 625 in background object color 615. If a color exists in text object colors 620 and 630 and background object color 625 but not in background object color 615, then this color could be added as an entry in the user preferences table with a background object color 615 as the missing color. If there is a blank text object color 620 corresponding to the newly added, previously missing color, then the color contrast adjuster would know that this background object color 615 is there merely to "hold" the color. Alternatively, text object colors 620 and 630 and background object color 625 could be extended to keep the red, green, and blue indications for their colors.

Default color combinations 607 are a set of color combinations used when the color contrast adjuster cannot determine a suitable color combination for the variety of text objects on a background object. This will be described below. Default color combinations comprise a default background color (light gray in this example), and multiple text object colors, one for each of the variety of text objects. In the example of FIG. 7, text, unvisited links, visited links, bold text, and italic text are text objects that are given colors for default color combinations 607. Any text object that can be given a color may be added to default color combinations 607.

The number of color combination entries 635 through 670 will likely be much higher than the examples shown. The more color combination entries used as background object colors, the finer the color resolution will be. However, this is highly dependent on the user, as some users will not be able to discern fine changes in colors. In addition, because the present invention may have its best application for those people who have some visual impairment, it is preferred that the user preferences be initially filled with a multitude of color combination entries that are tested for particular groups of people having certain visual impairments.

For instance, those people who are colorblind may find the current invention very helpful. Because the invention is applicable to these groups of people, it is recommended that the initial user preferences have a multitude of problem color combinations and preferred color combinations for this group. The color contrast adjuster, during initial set up and screening, could ask the user for their type of colorblindness. The color contrast adjuster could then select the appropriate color combination entries in the initial version of the user preferences that are applicable to this type of colorblindness. For example, people who have a red-green deficiency type of colorblindness, the most common type, can have trouble distinguishing between red and green. A group of these people can be tested with certain problem color combinations and a determination made for the best preferred color combinations for these problem color combinations. These color combination entries can be placed into the initial user preferences and marked as being for red-green deficient colorblindness. Additionally, people with a less common type of colorblindness cannot distinguish blues or yellows. They also may not be able to distinguish blue from green or recognize violet. A group of people having this type of colorblindness could be tested with certain problem color combinations and a determination made for-the best preferred color combinations for these problem color combinations. These color combination entries can be placed into the initial user preferences and marked as being for "blue-green" deficient colorblindness.

Alternatively, there could be multiple initial user preferences that are designed for particular visual anomalies. The correct user preferences is then selected based on the user's selection of their visual impairment. Regardless of how the initial user preferences is selected, once the user preferences is selected, this user preferences is then used for the particular user who chose it.

Thus, it is preferred that multiple groups of people having certain visual impairments be tested and the results entered into one large or several small user preferences so that the initial user preferences will contain sets of recommended color combination entries for these tested groups. Additionally, it is preferred that the user be tested for visual impairments during initial installation or set up of the color contrast adjuster so that the color contrast adjuster can then choose the best set of recommended color combinations for this user. Visual impairment tests are well known to those skilled in the art.

Even if there are no entries in an initial user preferences, because the user preferences is extensible, the user will be given ample opportunity to add his or her problem color combinations and preferred color combinations into user preferences. One preferred manner of adding additional user-chosen color combination entries into user preferences is shown with reference to FIG. 9.

Figure 3:
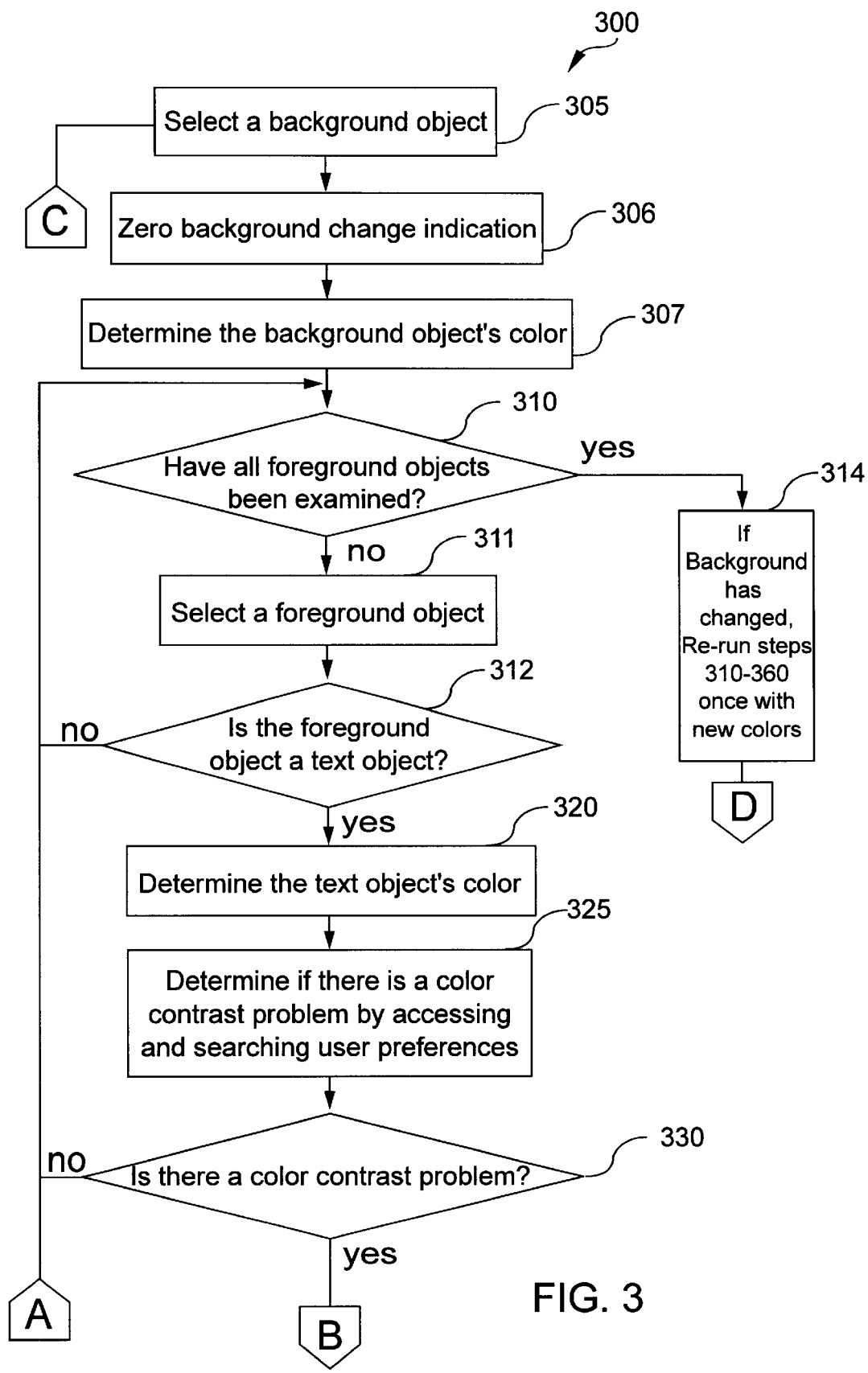
FIGS. 3 and 4 are portions of a flow diagram for selecting and applying a color combination for text and backgrounds in accordance with a preferred embodiment of the present invention.
Figure 4:
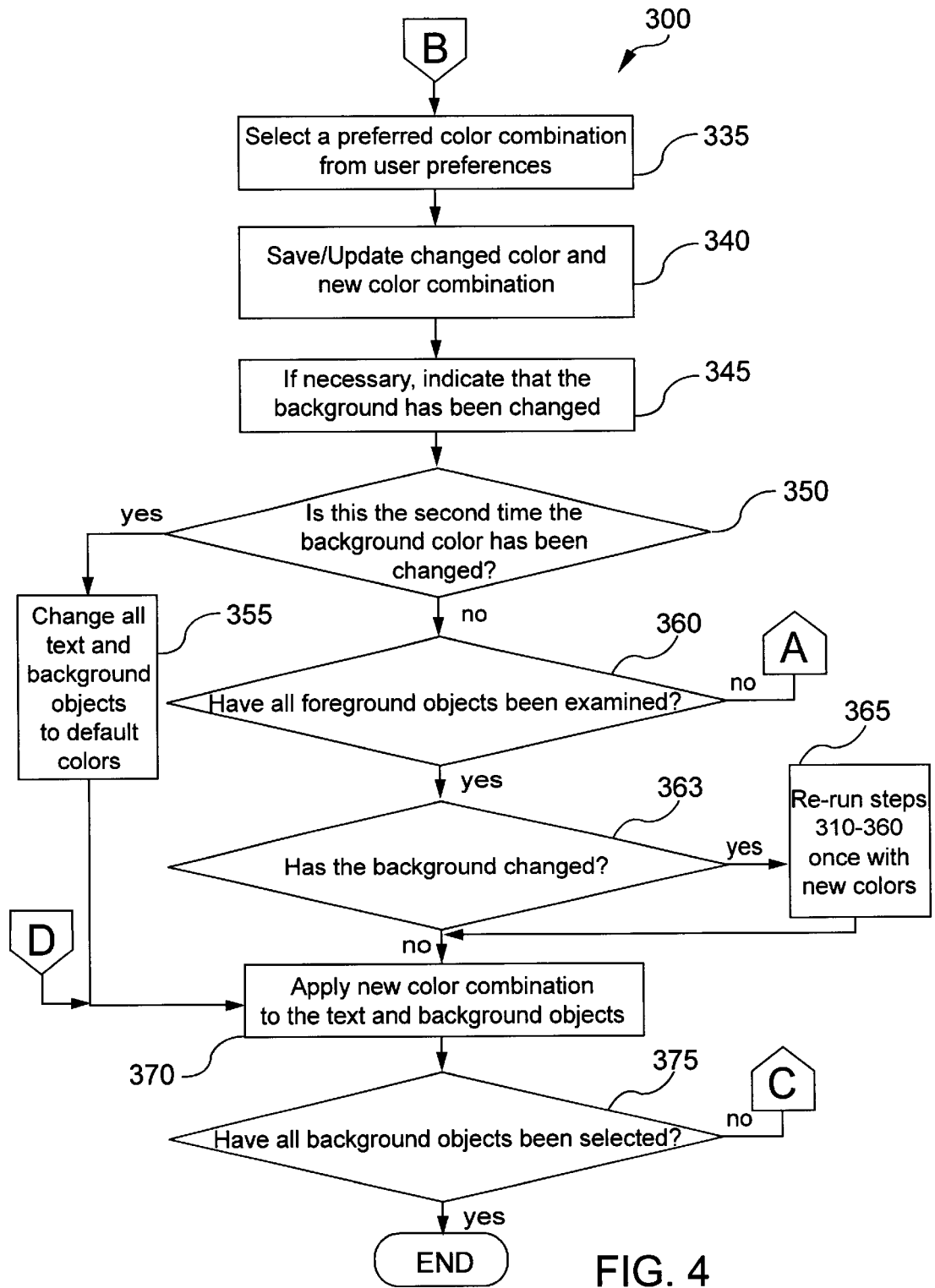

Turning now to FIGS. 2, 3 and 4 in addition to FIG. 7, FIGS. 3 and 4 each contain portions of a preferred method 300 used by the color contrast adjuster to determine color contrast problems, select a preferred color combination, and apply the preferred color combination. This method is performed by the color contrast adjuster whenever a web page is loaded by browser 122. Alternatively, the color contrast adjuster can store the color contrast changes made to previously viewed web pages, so that the color contrast adjuster would perform method 300 on new web pages only.

Method 300 starts when a background object is selected in step 305. Methods for selecting background objects on web pages are known to those skilled in the art. In general, the background and locations for tables, the web page itself, or frames are written in hypertext markup language (HTML) and can easily be found. Names and locations of background images (such as GIF or JPEG images) can likewise be found through HTML, javascript; the, JAVA programming language, and the like. The browser knows where and how to place backgrounds and text, and the rules for placement and location may be used to determine the location of background and text objects. Once located, these objects may be selected. Any method that allows background objects to be chosen or selected may be used herein. For instance, in U.S. Pat. No. 5,377,314, entitled "Method and System for Selective Display of Overlapping Graphic Objects in a Data Processing System," by Bates, et al., overlapping graphics objects may be individually selected.

If desired, step 305 may also include determining how many background objects there are. Alternatively, the file being shown on interface 200 by browser 122 can be searched until all background objects have been selected singly. Additionally, this step could include waiting until the entire HTML page has loaded, then organizing, in tabular format, each of the background objects and each foreground object that corresponds to each background object. Step 305 would then begin when one of the background entries in the table is selected. Regardless of how one selects and/or tabulates background and foreground objects, what is important is that background objects and foreground objects are selected such that their color combinations can be compared with problem color combinations. In the current example, background 240 of FIG. 2 has been selected as the starting background object.

Method 300 is preferably performed on a background-by-background basis. In other words, one background is selected, the foreground objects are examined for text objects, the color combinations of the text objects and background are determined and examined to see if there are any problem color combinations, and new color combinations are selected and applied to problem color combinations. The reason for the preferred background-by-background color combination determinations is that there may be multiple text objects having different colors and/or the background could have more than one color. Because of this, there may be multiple color combination problems. For instance, if there are two text objects (one black and one red) on a dark green background, each of these color combinations (black text on the dark green background and red text on a dark green background) could be problem color combinations. For the first color combination, the color contrast adjuster may select and apply a color combination of black text on a grey background. For the second color combination (which is now red text on a grey background), the color contrast adjuster may select and apply a color combination of red text on a black background. The first color combination that was originally black text on a dark green background is now black text on a black background. The color contrast adjuster will determine this problem color combination and compensate for this, generally by changing all text objects and background objects to default color combinations.

Performing method 300 on a background-by-background basis makes poor color combinations such as those just described easier to find and to correct. If desired, method 300 could be performed on a foreground object basis. Each foreground object could be compared against its background object, and the appropriate color combination selected and applied. Care must be taken, however, to ensure that poor color combinations that result from changing original color combinations are detected and corrected.

In step 306 of FIG. 3, the color contrast adjuster zeros the color combination change indication. When there are multiple text objects per background object and/or if the background object contains more than one color, the color contrast adjuster may change the color combination of text and background more than once. To prevent possible poor combinations of selected and applied color combinations, the color contrast adjuster keeps a-background change indication. The background change indication indicates how many times the color contrast adjuster has changed backgrounds due to problem color combinations. If the color contrast adjuster changes the current background a certain number of times (two times is preferred in method 300), then the color contrast adjuster preferably changes all text objects and the background to default color combinations. In step 306 of FIG. 3, the background change indication is zeroed so that the color contrast adjuster can keep the number of background color changes on a background-by-background basis. If desired, instead of a background change indication, the color contrast adjuster can keep a color combination or text change indication, so that default colors are used if color combinations or text colors change a certain number of times.

Figure 5:
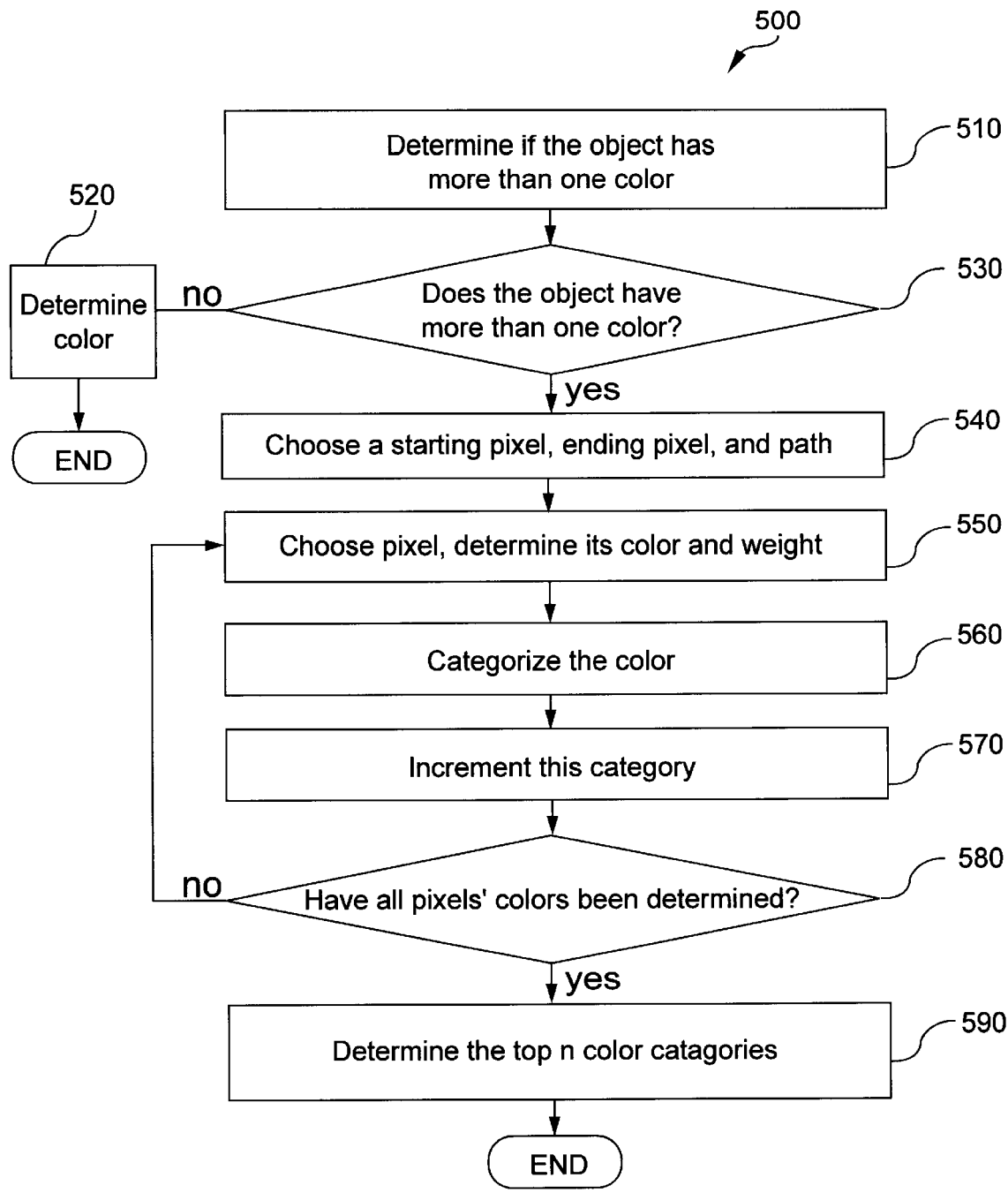
FIG. 5 is a flow diagram illustrating determining color in accordance with a preferred embodiment of the present invention.

In step 307 of FIG. 3, the background object's color is determined. The method used to determine the color is based on the background. If the background is a table, button, or web page background, for instance, the background's color may be determined by accessing the web page that is written in HTML. If the background is a GIF or JPEG file, then screen information can be accessed to determine the color, the background object itself (the GIF or JPEG file) can be accessed to determine the color of individual pixels in the background object, Application Programmer Interfaces (APIs) may be used to determine an object's color, the web browser's data structures may be accessed to determine the color, etc. If the screen information is accessed to determine colors, the location of the object on the screen must first be determined. These manners of determining the color of objects and of locating an object on the screen are well known in the art. One preferred method for determining the color of a background or foreground object is shown in FIG. 5. In FIG. 2, background 240 is a table background with a yellow-green color.

In step 311, the color contrast adjuster makes a determination as to the status of the current color combinations. If the color contrast adjuster has not examined all of the foreground objects (step 311=no), then the color contrast adjuster selects a foreground object. To select a text object, the HTML file may be searched at one time to retrieve all text objects and their locations. Alternatively, the HTML file may be accessed each time step 311 is performed and a determination made as to which foreground objects for the current background have not been examined.

If the foreground object is not a text object (step 312 of FIG. 3=no), then steps 310 and 311 of FIG. 3 are performed again. If foreground object is a text object (step 312 of FIG. 3=yes), the next steps in the method are performed. In the example of FIG. 2, there are three foreground objects on background object 240: text 245, link 250 and italics 241. Each of these is a different color. At this time, assume that the color contrast adjuster selects text 245. In step 320, the color contrast adjuster determines the text object's color. The color of text objects is primarily determined by accessing the HTML file of the web page, as is well known in the art. Additionally, if the current invention is extended to non-browsers, other methods may be used to determine the text color. For instance, some collaboration tools send text in rich text format or extensible markup language. Methods exist for using these standards to determine text (and background) colors. In step 320 of FIG. 3, the color contrast adjuster access the HTML file for web page 125 and determines that text 245 is black.

The color contrast adjuster determines, in step 325 of FIG. 3, if there is a color contrast problem. The color contrast adjuster accesses user preferences and searches through users preferences looking for a match between the current color combination (a black text object on a yellow-green background) and a problem color combination. If a match is not found (step 330 of FIG. 3=no), step 311 of FIG. 3 is performed.

If a match is found (step 330 of FIG. 3=yes), the color contrast adjuster selects a preferred color combination that corresponds to the current color combination in step 335 of FIG. 4. In the example of FIG. 2, a current color combination of black text on a yellow-green background is a problem color combination that is indicated in user preferences. This can be seen in user preferences 124 of FIG. 7, in entry 635, where the color combination of a yellow-green background 615 with black text 620 is a problem color combination 610. For this problem color combination 610, there is a preferred color combination 605 of a light gray background color 625 and a black text color 630 (as stated above, the text color of black is assumed because the text color 630 is empty).

In step 335 of method 300 (of FIG. 4), the color contrast adjuster selects a preferred color combination from user preferences. This color combination, as indicated above, is preferred color combination 605 in entry 635 (of FIG. 7) of a light gray background color 625 and a black text color 630. The color contrast adjuster then saves the changed color in changed color storage 126 and saves the preferred color combination (step 340 of FIG. 4).

Turning now briefly to FIG. 8, this figure shows a preferred changed color storage 126. Changed color storage 126 comprises the name of the former color 710 and an object reference 720. The name 710 indicates the name of the former color. As discussed previously, the color contrast adjuster preferably allows a user to place a cursor over an object whose color has changed. The color contrast adjuster will preferably then display the former color of the object. This feature allows the user to determine the names of the colors of the objects whose colors have changed. The object reference 720 determines the object whose color has been changed. Javascript and other technologies allow one to name or number objects so that the object can be determined and located. If desired, a location column could be placed in changed color storage 126 that tells location of the object in the browser's data structure, the browser's window, or the HTML file. Concerning the latter, the HTML file can then be accessed to find the object in the HTML file and then, from there, to find the location of the object on the browser's window. Any method known to those skilled in the art for tracking the location and former colors of objects may be used in changed color storage 126.

If there are multiple colors in the background, for instance if a background object is a GIF or JPEG file, the object name and location may be kept in changed color storage 126 without a color indication 710. For instance, entry 760 contains the name of a GIF object, "Name_1," and where the HTML file references the object, but does not contain a name of a color because there are multiple colors in the GIF file. If desired, a name such as "multiple colors" could be placed in name 710 for entry 760.

Returning to FIGS. 2, 3, 4, and 7 along with FIG. 8, when the color contrast adjuster saves the changed color for the table background (in step 340 of FIG. 4), the color contrast adjuster creates entry 740 in changed color storage 126 in FIG. 8. The former color 710 indicates that this object was yellow-green and the object reference 720 indicates that this object is a table background (and will likely be an object name or number in javascript). The object name or number then provides the ability to locate the object. If desired, this location could be converted from HTML to a location on the web browser's window or a screen location. Essentially, any mechanism known to those skilled in the art that allows the determination of a location and previous color of a changed text or background object may be used as changed color storage 126.

Note that, in step 340 of FIG. 4, the color contrast adjuster stores the new color combination, which in this instance is the new background object color of gray. By storing new color combinations, the color contrast adjuster is able to wait until step 370 of method 300 to apply all the color combinations for the currently selected background at once. Note also that it may be beneficial for the color contrast adjuster (in concert with the browser) to wait to show a background until after all text objects on the background have been downloaded and method 300 has been run on that background object. This would prevent the situation where the background and part of the HTML file having the text objects are downloaded, the browser shows part of the web page, then the rest of the web page is downloaded. After the rest of the web page is downloaded, the color contrast adjuster runs method 300 on this (probably large) background and realizes that there is bold lettering at the bottom of the background that necessitates a change in the background. The color contrast adjuster would then change the background after the user may have already had a fairly significant time to observe the page and may not even be able to see the bold text at the bottom of the background. When the color contrast adjuster changes the background, the user might see this change in background color and be startled or annoyed by the apparent change in color.

Alternatively, if the color contrast adjuster can make changes to background and text object colors while the HTML page is loading, and make the changes such that the user would not notice the color change, the color contrast adjuster can apply color changes as soon as problem color combinations are found. Additionally, the point at which the color contrast adjuster changes colors (all at once and where the page is withheld until all problem colors are found, or as the page loads and problem color combinations are found) may be set by the user.

In step 345 of FIG. 4, the color contrast adjuster indicates, preferably by incrementing the background change indication, that the background has been changed. In step 350, the color contrast adjuster determines if this is the second time the background has been changed, preferably by checking a background change indication. If there are multiple text objects of different colors on a background object and/or if there are multiple colors in the background object, then the color of the background object may be changed several times. In step 350 of FIG. 4, if the background has changed twice (step 350=yes), the color contrast adjuster changes all text and background objects to default colors (step 355 of FIG. 4) by using the default color combinations 607 of FIG. 7. When changing all text and background objects to default colors, the color contrast adjuster (in step 355 of FIG. 4) should also update changed color storage 126. Changing to the default color combinations prevents the condition where the background color oscillates between multiple background colors. If desired, the color contrast adjuster may be made to wait until the third or fourth background color change before changing to default colors.

If this is not the second time that the background object's color has been changed (step 350=no), then the color contrast adjuster determines if all foreground objects for this background object have been examined. If there are foreground objects left to examine (step 360=no), then the color contrast adjuster performs step 31 1. In the current example, there are two foreground objects left to examine (italics 241 and link 250).

Now that most of the steps in method 300 have been discussed, the rest of the elements in FIG. 2 will be discussed with limited reference to the steps in FIG. 3. However, important steps in FIG. 3 will be discussed when needed.

The color contrast adjuster determines that not all text objects have been examined, so it selects text object 241, which is a darker-blue italic word. When the color contrast adjuster determines if there is a color contrast problem, the color contrast adjuster uses the current color combination of a light gray background (the recently recolored background) and darker-blue italics. As can be seen in entry 667 of user: preferences 124, there is no color combination that has both of these colors. There is an entry 667 that has a background object color 615 of light gray, but there is no text object color of darker blue that corresponds to light gray in entry 667.

Because of this, the color contrast adjuster in step 330 determines that there is no color contrast problem (step 330=no).

Next, the color contrast adjuster again performs steps 310 and 311. Because not all text objects for the currently selected background have been examined, the color contrast adjuster selects the last foreground object, (unvisited, in this example) link 250. This link is, per the web page's HTML file, orange-red. When the color contrast adjuster determines if there is a color contrast problem for this current color combination of a light gray background and an orange-red link (step 325), the color contrast adjuster determines that there is a color contrast problem (step 330=yes). As evidenced by entry 667 of user preferences 124 of FIG. 7, the color combination of a light gray background 615 and an orange-red link 620 is a problem color combination 610. The preferred color combination 605 for this problem color combination is a text object color 630 of black and the same background color (as indicated by an empty preferred background color 625) of light gray. The color contrast adjuster selects this preferred color combination by accessing user preferences.

The color contrast adjuster then saves the information for link 250 in changed color storage 126 of FIG. 8. This is indicated by entry 750 of changed color storage 126.

Object 720 is preferably a name that allows the link or links to be referenced in javascript or JAVA and to allow methods such as onMouseOver to be run on the object. Additionally, the color contrast adjuster saves the new color combination, which in this instance is the color black for links.

The color contrast adjuster determines that this is not the second time that the background has changed and determines that all foreground objects have been examined (step 360=yes). If the background has changed (step 363=yes), the color contrast adjuster then re-runs step 310 through 360 with the new color combinations because the background has been changed (step 365). Step 365 (and also step 314) prevents the condition when several text objects have already been examined but the color contrast adjuster has not changed the background. If the color contrast adjuster then finds a color contrast problem with another text object such that the background color is changed, the previous colors have not yet been examined with the new background color and there may be one or more color combination conflicts. By running these steps again, all text objects can be compared with the new background color. It is preferred that step 365 (and step 314) only be run once per background and then only if there has been a change in background (as indicated by the background change indication).

For table background 240 of FIG. 2, the re-run of steps 310 through 360 (of FIGS. 3 and 4) with a light gray background does not find any problem color combinations because the text objects' colors are black and darker-blue, but none of these colors are indicated in entry 667 of user preferences 124 of FIG. 7 as causing a color contrast problem with the current light gray background object. Thus, the color contrast adjuster applies the new color combinations to the text and background objects instep 370 of FIG. 4). This entails determining the current color combinations (which have been saved in step 345 of FIG. 4) and applying these color combinations to their respective text objects and the one background object.

To do change text objects' colors, any method known to those skilled in the art that can change text and background colors may be used. For instance, the screen areas where the text and background are could be changed to preferred colors, pixel by pixel. Writing to the screen to change colors can be time consuming and complex, as changes to the screen (e.g., resizing the browser's window) must be constantly updated. Because the browser already keeps track of the objects it is currently displaying, mechanisms other then writing colors to the screen are preferred. Most preferably, the data structures of the browser are accessed by the color contrast adjuster and changed to indicate the new colors. For instance, if there is a background color for the entire web page, this color will be written into the data structures for the web browser. The color contrast adjuster could find this color value and change it to the preferred background color. For complex backgrounds and objects such as GIF or JPEG files, the color contrast adjuster could delete references to these files and place references to the preferred color for a background of the same size and general shape.

The second most preferred mechanism for applying the new color combinations is to search the HTML file for these objects and replace the color of the objects. The "new" HTML file is then handed to the browser to display. This mechanism has the benefit that previously viewed web pages are already stored with preferred color combinations and the color contrast adjuster does not have to determine and apply preferred color combinations for these pages. As in the most preferred mechanism, simple objects such as text, paragraphs, and general backgrounds are found in the HTML file and the code for current problem colors are preferably remarked out. Statements indicating new colors are added by the color contrast adjuster. For complex backgrounds such as JPEG files, the references to the JPEG files are remarked out and new statements are added that describe a background object of similar-shape but with the preferred colors, as is known in the art. Additionally, the color contrast adjuster can make a copy of the old HTML file for future reference.

For example, if table 240 of FIG. 2 has a statement for its color of "<tr bgcolor=909E70>"(which falls within the yellow-green color-indicated in entry 635 of FIG. 7), then the color contrast adjuster can simply change this to a light gray color through the statement, "<tr bgcolor=E6E6FA>". Similarly, the color contrast adjuster could find this color in the browser's data structures and change color as described. For those backgrounds that are multicolored, such as JPEG or GIF files, the color contrast adjuster can mark these lines as comments (by surrounding them with "<!" and ">" in HTML files, as in known in the art) and then creating an appropriate background color through methods known in the art. When the "new" HTML file is handed to the browser, the browser will create the page using preferred color combinations. For the browser's data structures, the color contrast adjuster can find the references to the JPEG or GIF files, delete (or change) these references and add new references to reference a new background object (such as a table background) of the appropriate color. In addition, if this web page is accessed during the same session (by using the "back" button of a browser, for instance), the local copy of the web page will already be in the correct format when using the color contrast adjuster mechanism that changes HTML files. Note that it is best to have the browser not display the web page until all changes to the HTML file or data structures have been made, or else the user may see color combinations change as the color contrast adjuster changes the HTML file or data structures.

After the color contrast adjuster applies the new color combinations, the color contrast adjuster determines if all background objects have been selected in step 375 of FIG.

4. In the current example, only one of the backgrounds in web page 125 of FIG. 2 has been examined (step 375=no). Because of this, the color contrast adjuster then selects another background object in step 305 of FIG. 3.

The next background object selected by the color contrast adjuster is GIF file 263 (shown-in FIG. 2). This background object does have one foreground object, bf FIG. 3 fails (step 312=no) because there are no foreground objects that are text objects. The color contrast adjuster determines that all foreground object have been selected (step 310), determines that the background has not changed (step 314), does not apply the new color combination as there is no new color combination (step 370), determines that not all background objects have been selected (step 375), and finally selects another background object (step 305). The next background object selected by the color contrast adjuster is background GIF 260. This background object has one foreground object, the table background 256, and step 312 again fails because there is no text object on background 256. Note that, if desired, step 307 may be placed after step 312. This would allow a determination of whether or not there is a text foreground object on the background (step 312) prior to determining the background object's color, which can be a time-consuming process if the background is multicolored.

The color contrast adjuster then selects, in step 305, the table background 256, which is a darker-blue background. There are two text objects on this background, text 280 and text 287. In step 305, the color contrast adjuster selects the text object 280, which is red text. The color contrast adjuster determines, by using user preferences, that there is a color contrast problem for this user and this combination of colors (step 330=yes). Based on entry 650 in user preferences 124 of FIG. 7, the color combination of a darker-blue background with yellow green text is a problem color combination 610 corresponding to a preferred color combination 605 of a light gray background with a black text object. Thus, the color contrast adjuster selects this preferred color combination, updates the changed color storage with the changed color, and indicates or temporarily stores the new color combination.

The color contrast adjuster during step 335 of FIG. 4 adds entries 770 and 775 to changed color storage 126, as shown in FIG. 8. These lines indicate the name 710 of the previous color and the object 720 being changed. For instance, in line 770, it is indicated that the darker-blue table background (Table_background_2) has been changed to a different color, while the red text ($Text_{13}$ 1) has been changed to different color.

The color contrast adjuster then indicates in step 345 of FIG. 4 that the background has been changed for the first time, preferably by incrementing the background change indicator (note that the color contrast adjuster reset the background change indicator in step 306). Because all foreground objects have not been examined (step 360=no), the color contrast adjuster then selects another foreground object (step 311). The foreground object selected is the text object 287, which is red lettering. When the color contrast adjuster accesses and searches user preferences for a match between the current color combination and a problem color combination, the color contrast adjuster uses the current color combination of a light gray background and red text.

As seen in entry 667 of user preferences 124 (of FIG. 7), this current color combination matches the problem color combination in this entry. This entry also indicates that the text object should be changed from red to black (as per preferred color combination 605). The color contrast adjuster updates changed color storage 126 of FIG. 8 by adding entry 777. Entry 777 indicates that the color contrast adjuster has changed the color of the red text (referred to by its object name of "Text_2").

In step 340 of FIG. 4, the color contrast adjuster also saves the new color combination, which in this instance is the new color for the text. Because this is not the second time that the background's color has changed, and not all foreground objects have been examined, the color contrast adjuster selects another foreground object.

The foreground object selected by the color contrast adjuster is button 264 (of FIG. 2). There are several ways of making a button. One way is to describe the text separately from the button (which is itself a GIF or JPEG file), such that the text is placed on the button. Another way is make a GIF file that is the button, such that the GIF file "includes" the text by having text embedded into and not separable from the GIF file. There are even more ways of making buttons, such as using javascript to choose one GIF file if the cursor is over a button and another GIF file if the cursor is not over a button. For the current example, assume that the text is described separately from the button. Because the button is not a text object (step 312=no), the color contrast adjuster selects the last foreground object, the button 265. Because this button is also not a text object, the color contrast adjuster runs steps 310 again.

While running step 310 again, the color contrast adjuster determines that there are no more foreground objects to examine (step 310=yes). At this stage, the color contrast adjuster determines if the background has changed and re-runs steps 310 through 360 with the new colors if the background changed (step 314). Again, step 314 protects against the case where problem color combinations are discovered and changed to preferred color combinations, and the change to preferred color combinations causes a problem color combination with previously examined text objects and the new background color. However, to prevent infinite loops, step 355 exists to change all text objects and the background object to the preferred default colors. Additionally, in step 314 (and 365), steps 310 through 360 are only run once for the current background. In other words, all foreground objects are examined for the current background.

In this instance, the background has changed and the color contrast adjuster again runs steps 310 to 360, also setting an indication that these steps are being re-run. The color contrast adjuster examines all foreground objects for this background object during steps 310 to 360. Because background 256 has been changed to light gray and text objects 280 and 287 have been changed to black, there are no color contrast problems. This is illustrated by entry 667 of user preferences 124 of FIG. 7, where there is no problem color combination of a light gray background and black text. After the color contrast adjuster examines text objects 280 and 287, the color contrast adjuster will again examine the buttons 264 and 265, and determine that these are not text objects. Again, the color contrast adjuster will run 310 and determine that all foreground objects have been examined. This time, the color contrast adjuster will run step 370 because the indication that determines whether steps 3 10 through 360 have been re-run will be set (also, the background has not been changed). In step 370, the color contrast adjuster applies the new color combinations. As stated previously, the color contrast adjuster makes changes to the currently existing or "new" HTML file to change the colors of the text objects 280 and 287 and the background object 256 to the preferred colors, or makes changes to the browser's data structures for these objects.

In step 375 of FIG. 4, the color contrast adjuster finds that not all background objects have been selected and returns to step 305 of FIG. 3 to select another background object. Note that method 300 would end at this point if the buttons were GIF buttons with no text object over the buttons. Because the buttons are GIF buttons with text objects over the buttons, the color contrast adjuster continues the method in step 305 of FIG. 3 by selecting one of the buttons. The button the color contrast adjuster selects in step 305 is button 264. This button is a red button that includes a black, lined border. The GIF file contains all elements of the button other than text 275. Because the button is multicolored, determining the background object's color will be a bit harder. A preferred method for determining both single colored and multicolored objects will be described in reference to FIG. 5.

Assume for now that, because the button is primarily red, that red is used as the color of button 264. In addition, text 275 is yellow. When the color contrast adjuster determines if there is a color contrast problem, the color contrast adjuster finds a color contrast problem for this user. This is shown in entry 650 of user preferences 124 (of FIG. 7), where there is the problem color combination of a red background with yellow text. The preferred color combination 605 for this problem color combination is a light gray background with black text.

The color contrast adjuster updates changed color storage of FIG. 8 by adding entry 760. Entry 760 indicates that there is a GIF file object named "GIF_file_Name_1" that can be located through javascript or other methods. Javascript (or other methods) can then be used to determine when the cursor is over the object. For instance, the "onMouseOver" method associated with the GIF object will run a section of code when the mouse is positioned over the GIF object. It should be noted that the GIF object is already changed to another color.

The color contrast adjuster then, in step 363 of FIG. 4, should run steps 310 through 360 because the background has changed. However, because there is only one text object on the background object, the color contrast adjuster could forego steps 310 through 360, if desired. In step 370, the color contrast adjuster applies the color combination by either changing the HTML file and handing the changed HTML file to the browser or by modifying the browser's data structures for the current web page.

The color contrast adjuster is able, using the changed color storage 126 of FIG. 8, to indicate to the user the color of any changed objects. By using javascript or JAVA, the color contrast adjuster can find location of the cursor and whether or not the location of the cursor is above an object (such as a button). When the color contrast adjuster determines that the cursor is over an object whose color has been changed, the color contrast adjuster uses changed color storage 126 to find the object in the storage (object 720) and find the previous color 710 corresponding to that object. The color contrast adjuster can then display color 710 to the user. In the current example, when the user places the cursor over button 264 (which was red but is now light gray), the color contrast adjuster displays the color "red". This provides the user with an indication of what color the object was before the color contrast adjuster changed the color.

Because not all background objects have been selected (step 375 of FIG. 4), the color contrast adjuster selects the last background object (button 265 of FIG. 2) in step 310 of FIG. 3. This button is similar to button 264 in that the button is a GIF file that has separate text 285. The GIF file is mainly black with a white border. All of the elements (the black and the border) are contained in the GIF file. Text 285 is yellow-green. In step 307, the color contrast adjuster determines the background color as being primarily black. The preferred method for determining the color of multicolored objects will be described in reference to FIG. 5.

When the color contrast adjuster determines if there is a color contrast problem, the color contrast adjuster finds entry 660 in user preferences 124 of FIG. 7. This entry indicates that yellow-green text on a black background is a problem color combination and that the preferred color combination for this user is white text on a black background. The color contrast adjuster, in step 365 of FIG. 4, determines that the background has not been changed, so that steps 310 through 360 do not have to be run. Instep 370, the color contrast adjuster applies the color combination by changing the color in the HTML source file for this text. The color contrast adjuster then adds entry 780 to changed color storage 126 to indicate that the text (Text_3) has changed.

Finally, the color contrast adjuster in step 375 of FIG. 4 determines that all background objects have been examined and ends method 300. Note that changes to background and/or text object colors can be made all at the end of processing, if desired, or each change to a color combination may be made at one time, as example method 300 shows.

Turning now to FIG. 5, this figure illustrates a preferred method for determining the color of an object. This method is used by the color contrast adjuster in steps 307 and 320 of FIG. 3. The method starts when the color contrast adjuster determines if the object has more than one color (step 510). Generally, this entails determining if the object is an entity whose color is described in the HTML source code for the web page. If the object is a GIF or JPEG file (or other graphics file), then it is assumed that the file is multicolored.

If the object has only one color (step 530=no), then the HTML file is accessed in step 520 to determine the color. Determining the color of HTML entities is well known in the art. If the object has more than one color (step 530=yes), the color contrast adjuster chooses a starting pixel, ending pixel, and path in step 540. Generally, because most backgrounds are square, one of the corner pixels will be the starting location, the catty-corner pixel will be the ending location, and the path will be row-by-row.

The color contrast adjuster next selects or chooses one pixel and determine this pixel's color and weight. The color contrast adjuster may determine the color of pixels by decompressing the JPEG or GIF file (or portions of the file), placing the file in memory, and then determining the color of each pixel. Alternatively, the color contrast adjuster can use APIs, a plug-in, or the browser to decompress the file and then the color contrast adjuster could access the decompressed file. Additionally, if the file is already being shown on the screen, the color contrast adjuster can access pixels of the screen to determine this pixel's color. Any method known to those skilled in the art may be used to determine the color of pixels in these files.

Figure 6:
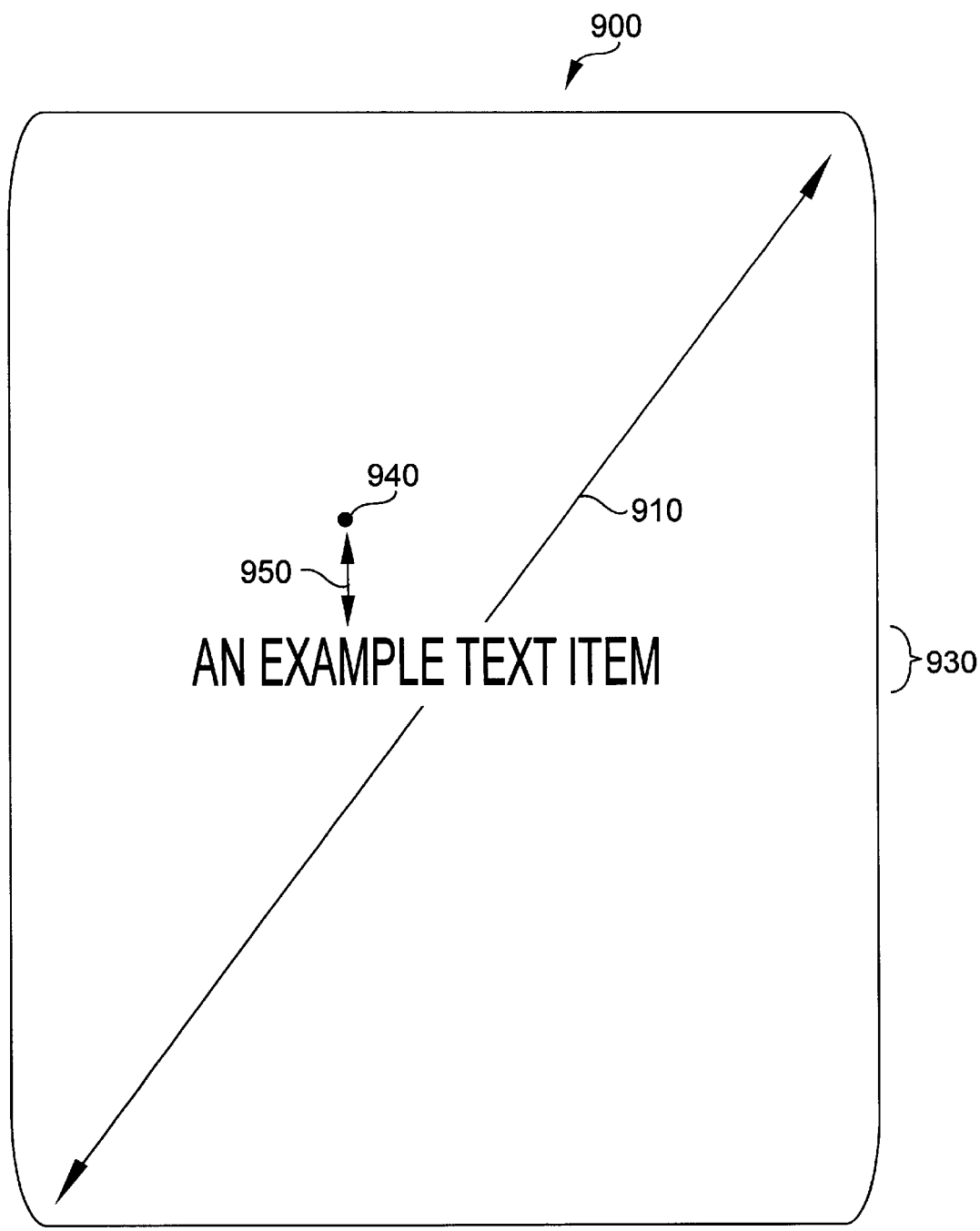
FIG. 6 is a portion of a web page that is used to illustrate a preferred method of determining color in accordance with a preferred embodiment of the present invention.

Concerning the weight, each pixel is weighted to determine how its color should be added. One preferred weighting method will be discussed in reference to FIG. 6. For small background objects such as buttons, the weight can be one. Additionally, the weight can be one for large backgrounds also, if the added complexity associated with FIG. 6 is not desired.

The weight determined in step 550 is used in step 560 when the color is categorized. The color is categorized by selecting the background colors 615 of user preferences 124 of FIG. 7. By using these background colors, the color determination is then tailored to the user. If the user has selected and can distinguish from a lot of background colors, there should be more background colors 615 in user preferences 124. If the user cannot adequately determine a lot of colors, there should be less background colors 615 in user preferences 124. Alternatively, a certain number of colors can be chosen (for instance, 256 colors) instead of using user preferences 124, and these colors can become the categories used in method 500.

After the color contrast adjuster categorizes the color, the weight for this pixel is added to the category. For instance, if the pixel is blue and the weight is one, the "blue" category is incremented by one. If the pixel is blue and the weight is 0.335, the "blue" category is incremented by 0.335. If all pixels' colors have not been determined (step 580=no), the color contrast adjuster chooses the next pixel. If all pixels' colors have been determined (step 580=no), the color contrast adjuster determines the top N color categories. The number N is determined during the initial set up of the color contrast adjuster by the user and may be changed by the user at any time. The default value is preferably three colors.

Note that if a weight of one is being used, it may be advantageous to calculate the percentage of the drawing covered by any pixel. This can be done by taking the number in the category and dividing by the total number of pixels. This will provide a percentage. For example, if there are 100 pixels total in the drawing and the number of blue pixels is 50, then the percentage would be 50/100 or 50 percent. Then, a limiting number such as 35 percent could be used, instead of N. If the color is greater than this limiting percentage, it is deemed important and is compared to the text object. If the color is less than this limiting percentage, it is deemed not important and is not compared to the text object.

What method 500 does is allow the color contrast adjuster to determine the major colors in a JPEG, GIF, or other file. These colors can then be compared with the text object color to determine problem color combinations. Because there are N colors that can cause color contrast problems between this background and the text on the background, the color contrast adjuster uses all of these N colors in comparisons with the text object on this background. For example, for button 264 of FIG. 2, the button is a GIF file that is a red color with a black border. If using the N color system, both black and red would be used as colors that the color contrast adjuster compares, with the yellow text, to problem color combinations. First, steps 310 through 350 (called a "partial method" herein) would be performed using the black background and the yellow text. Next, the partial method (steps 310 through 350) would be re-run using the red background and the yellow text (or, if the text was changed, the new text color). However, if either of these partial methods changes the background, then subsequent partial methods would not be run. In the example of button 264, when red background and yellow text are compared with problem color combinations, the red background is changed to light gray. If the black background has not yet been compared with the yellow text, the partial method would not be run.

Essentially, having multiple colors in the background means that steps 310 through 350 will be performed for each color of the background and one text object. For the next text object, steps 310 through 350 will be performed for each color of the background and this next text object. If more than one change occurs to the background, step 355 is run to change all color combinations to preferred color combinations.

Turning now to FIG. 6, a preferred weighting scheme is shown. This weighting scheme gives pixels closest to text objects the highest weight. Conversely, the pixels farthest from the text object are given the lowest weight. This scheme, thus, attempts to ascertain if colors close to the text are problem colors when compared to the text color. Those pixels (and colors) far away from the text should not create a problem color combination with the text, as the colors are too far from the text. For example, if there is a background of a rainbow and black text is in a swath of yellow color, this color combination may not be a problem color combination for the current user. The weighting scheme of FIG. 6 would determine that there is no problem color combination for this user because the yellow background is closest to the black text. By using a weighting scheme where the weight is always one, however, the color contrast adjuster might determine that there is a color contrast problem. Because the weight is one, the color contrast adjuster will weight each pixel—regardless of how close the pixel is to the text— equally. Thus, pixels that may be, for instance, red will be used to create the top N background colors. Some of these colors may have color contrast problems with the text, even though the only background colors that actually surround and are close to the text are yellow. The color contrast adjuster might change the background (or text) as per user preferences even though the user does not have a contrast problem for black text on a yellow background.

Background 900 is a multicolored background. Text 930 is on the background at a certain location. Diagonal 910 is the farthest distance between two pixels in background 900. If background 900 is not rectangular, then the farthest distance or an estimate of the farthest distance between two pixels in the background may be chosen. Pixel 940 is one pixel of the pixels that comprise the background. Distance 950 is the distance from pixel 950 to the nearest part of text object 930. The weight is then the following formula: one minus the fraction of the distance from that pixel to the nearest part of the text object divided by the length of the diagonal. If there is round-off error or other small errors, this number is rounded to one and is not negative. This formula gives a better indication as to which colors are closest to the text object, as the colors closest to the text object have the highest weight.

Figure 9:
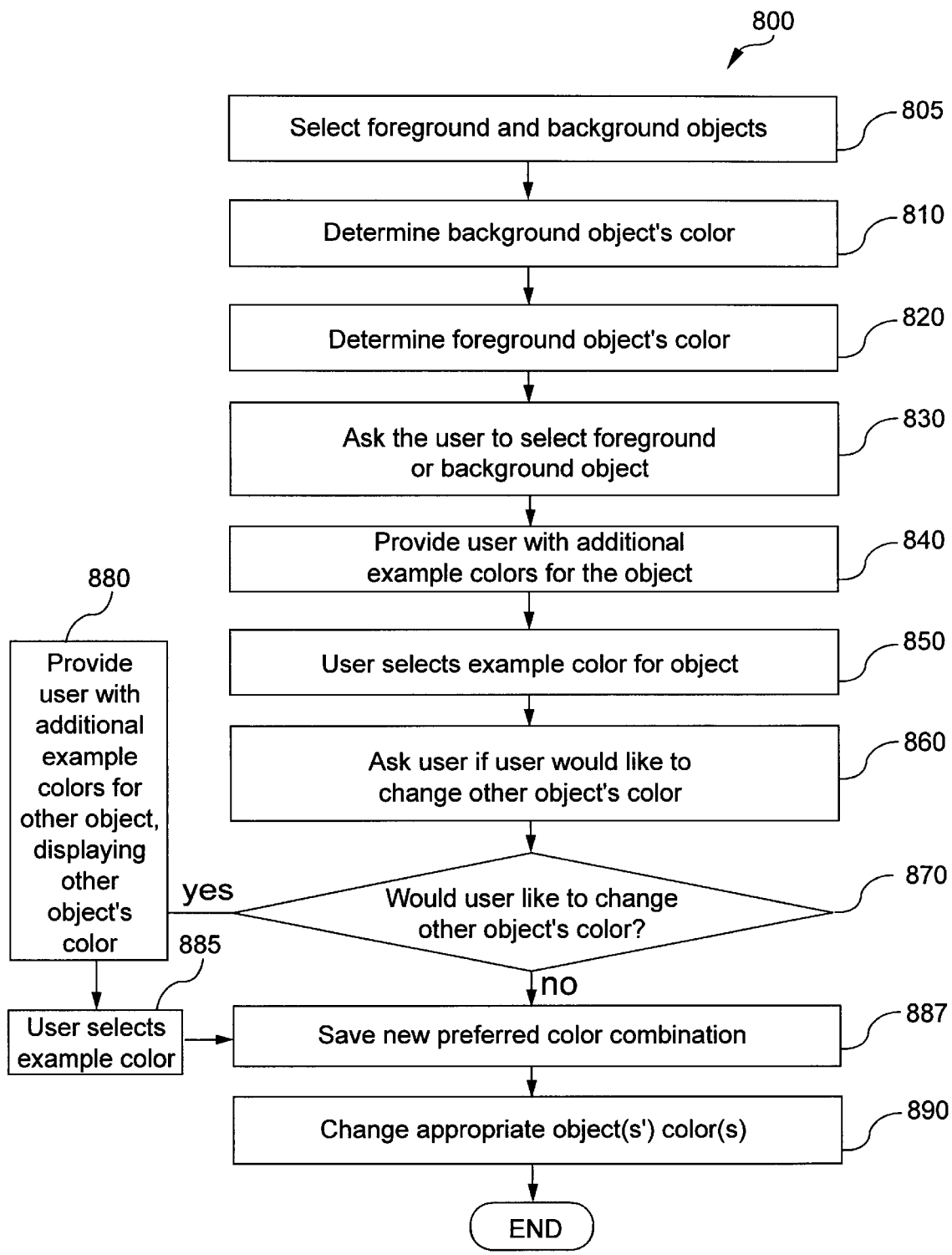
FIG. 9 is a flow diagram for selecting and adding a new preferred color combination in accordance with a preferred embodiment of the preferred invention.

Turning now to FIG. 9, a method 800 is shown that the color contrast adjuster uses when the user "pushes" the auto-contrast button 220 of FIG. 2. The color contrast adjuster during this method allows the user to select a preferred color combination for a problem color combination, and the color contrast adjuster adds these color combinations, as an entry, to user preferences 124. Method 800 starts soon after the user has indicated that there is a color contrast problem by pressing the auto-contrast button 220 on browser interface 200 (shown in FIG. 2).

Method 800 starts when the color contrast adjuster allows the user to select the foreground and background objects with which the user is having difficulty (step 805). The user then selects these objects by selecting or swiping an area of the web page (most preferred) or by clicking on each object (less preferred). If more than one text or more than one background object is selected, the color contrast adjuster should provide the user opportunity to re-select the objects.

In steps 810 and 820, the color contrast adjuster determines the background object's and foreground object's colors by using method 500 of FIG. 5. If there are multiple colors in the background, the color contrast adjuster can cycle through each background color or could provide a mosaic for the background of the top N colors. The color contrast adjuster, in step 830, asks the user to select either the foreground or background object, and the user selects one of these objects in this step. The color contrast adjuster provides the user with additional colors for the selected object in step 840. To provide additional colors, only a small palette of colors could be provided, or a large color matrix showing all colors could be provided. In step 850, the user selects a color for the object, which the color contrast adjuster shows in the display. Note that step 850 can be done a number of times until the user is finally ready to select the current example color (when the user would push a "finished" button, for instance).

Once the user has selected one color for one of the objects, the color contrast adjuster asks the user if he or she would like to change the other object's color (step 860). If the user would like to change the other object's color (step 870=yes), the color contrast adjuster provides the user with additional color for this object (either by using the old palette or matrix, or providing a new palette or matrix), and displays the other object's color along with the problem color for the other object (step 880). For instance, if the user selected black text in step 850, black text would show up on a background that is the problem background color as indicated by the user in step 805.

The color contrast adjuster allows the user to select the color of the other object (the second object) in step 885. Once the user finally selects this color or if the user indicated that he or she did not want to change the other object's color (step 870=no), the color contrast adjuster saves the new preferred and problem color combinations (step 887) as an entry in user preferences 124. The color contrast adjuster then applies this new preferred color combination to the objects (step 890).

Note that the colors discussed in the previous method will generally be color ranges because the number of colors. If desired, the user can make changes to the ranges to create finer or broadened color equivalents.

As shown in the previous examples, the preferred embodiments of the present invention provide a color contrast adjuster that selects and applies one of a plurality of color combinations for a text object and a background object based on a current color combination. The user has control over which colors cause a color contrast problem and which colors do not.

While the present invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   a browser residing in the memory and displaying at least one text object that is surrounded by a background object, the at least one text object comprising a text object color and the background object comprising at least one background object color, the text object color and one of the at least one background object colors comprising a current color combination;
   a user preferences residing in the-memory and comprising a plurality of problem color combinations and a plurality of preferred color combinations, each color combination comprising a text object color and a background object color, each problem color combination corresponding to a preferred color combination; and
   a color contrast adjuster residing in the memory, the color contrast adjuster selecting a specific preferred color combination corresponding to one of the problem color combinations and applying the specific color combination to the at least one text object and the background object if the current color combination matches a problem color combination in the user preferences.

2. The apparatus of claim 1 wherein a user sets the range of colors that comprises the match between the problem color combination and the current color combination.

3. The apparatus of claim 1 wherein the color contrast adjuster determines the at least one text object color and background object color.

4. The apparatus of claim 1 wherein the color contrast adjuster provides a user with at least one example color combination for the at least one text object and the background object, allows the user to choose an example color combination from the at least one example color combination, adds any chosen example color combination to the user preferences, and adds the current color combination to the plurality of problem color combinations, the current color combination corresponding to the chosen example color combination.

5. The apparatus of claim 1 wherein the at least one background object color is a plurality of colors and wherein the color contrast adjuster selects the specific color combination by combining each of the plurality of background object colors with the text object color to create a plurality of current color combinations and by comparing the plurality of current color combinations with the plurality of problem color combinations.

6. The apparatus of claim 5 wherein there is more than one match between the plurality of current color combinations and the plurality of problem color combinations, and wherein the specific color combination selected and applied by the color contrast adjuster is a default color combination.

7. The apparatus of claim 5 wherein the background object comprises a plurality of pixels, each pixel having a pixel color, and wherein the color contrast adjuster categorizes and weights each pixel's color.

8. The apparatus of claim 7 wherein the background object has a diagonal and wherein the weight assigned to a pixel's color is determined by one minus the fraction of the distance from that pixel to the nearest part of the text object divided by the length of the diagonal.

9. The apparatus of claim 7 wherein the weight is one.

10. The apparatus of claim 1 wherein the at least one text object is a plurality of text objects such that there are a plurality of current color combinations and wherein the color contrast adjuster compares each current color combination with the plurality of problem color combinations to select the specific preferred color combination.

11. The apparatus of claim 1 wherein the apparatus further comprises a cursor, wherein the color contrast adjuster saves the name of the color of the object whose color is changed in the current color combination when the color contrast adjuster applies the specific color combination to the at least one text object and the background object, and wherein the color contrast adjuster displays the name of the color when the cursor is placed over the object whose color is changed.

12. The apparatus of claim 1 wherein the browser comprises at least one data structure that comprises the text object color and the at least one background object color, and wherein the color contrast adjuster applies the specific color combination by modifying the text object color and the at least one background object color in the at least one data structure to the specific color combination.

13. A method for improving color contrast between browser displayed text objects and background objects, an at least one text object comprising a text object color and a background object comprising at least one background object color, the text object color and one of the at least one background object colors comprising a current color combination, the method comprising the steps of:

providing a user preferences that resides in the memory and comprises a plurality of problem color combinations and a plurality of preferred color combinations, each color combination comprising a text object color and a background object color, each problem color combination corresponding to a preferred color combination;

searching user preferences and comparing the current color combination with at least one of the plurality of problem color combinations;

selecting a specific preferred color combination corresponding to one of the problem color combinations if the current color combination matches the at least one problem color combination in the user preferences; and applying the specific color combination to the at least one text object and the background object if the current color combination matches the at least one problem color combination in the user preferences.

14. The method of claim 13 further comprising the step of a user setting the range of colors that comprises the match between the problem color combination and the current color combination.

15. The method of claim 13 further comprising the step of determining the text object color and the background object color.

16. The method of claim 13 further comprising the steps of providing a user with at least one example color combination for the at least one text object and the background object, allowing the user to choose an example color combination from the at least one example color combination, adding any chosen example color combination to the user preferences, and adding the current color combination to the plurality of problem color combinations, the current color combination corresponding to the chosen example color combination.

17. The method of claim 13 wherein the at least one background object color comprises a plurality of background object colors such that there are a plurality of current color combinations, wherein the method further comprises the step of selecting one of the plurality of current color combinations of the at least one text object and the background object as the selected current color combination, and wherein the steps of selecting one of the plurality of current color combinations, searching user preferences, and selecting a specific preferred color combination are performed until each of the plurality of current color combinations is compared to the plurality problem combinations unless more than one preferred color combination is selected, whereupon a default color combination is selected and applied.

18. The method of claim 17 wherein the background object comprises a plurality of pixels, each pixel having a pixel color, wherein the method further comprises the step of categorizing and weighting each pixel's color and the step of summing the weights for each color category and determining the highest N color categories having the highest sums, and wherein the highest N color categories are used as the plurality of background object colors.

19. The method of claim 17 wherein the at least one text object is a plurality of text objects such that there are a plurality of current color combinations, wherein the method further comprises the step of selecting one of the plurality of current color combinations of the at least one text object and the background object as the selected current color combination, and wherein the steps of selecting one of the plurality of current color combinations, searching user preferences, and selecting a specific preferred color combination are performed until each of the plurality of current color combinations is compared to the plurality problem combinations unless more than one preferred color combination is selected, whereupon a default color combination is selected and applied.

20. The method of claim 13 wherein the step of applying the specific color combination further comprises the step of saving the name of the color of the object in the current color combination whose color is changed during the step of applying the specific color combination, and wherein the method further comprises the step of displaying the name of the color when a cursor is placed over the object whose color is changed.

21. The method of claim 13 wherein the browser comprises at least one data structure that comprises the text object color and the background object color, and wherein the step of applying the specific color combination the specific color combination comprises the step of modifying the text object color and the at least one background object color in the at least one data structure to the specific color combination.

22. A program product that interacts with a browser, the browser displaying at least one text object that is surrounded by a background object, the at least one text object comprising a text object color and the background object comprising at least one background object color, the text object color and one of the at least one background object colors comprising a current color combination, the program product comprising:

a user preferences able to comprise a plurality of problem color combinations and a plurality of preferred color combinations, each color combination comprising a text object color and a background object color, each problem color combination corresponding to a preferred color combination;

a color contrast adjuster, the color contrast adjuster selecting a specific preferred color combination corresponding to one of the problem color combinations and applying the specific color combination to the at least one text object and the background object if the current color combination matches a problem color combination in the user preferences; and signal bearing media bearing the color contrast adjuster.

23. The program product of claim 22 wherein the signal bearing media comprises transmission media.

24. The program product of claim 22 wherein the signal bearing media comprises recordable media.

25. The apparatus of claim 22 wherein a user sets the range of colors that comprises the match between the problem color combination and the current color combination.

26. The apparatus of claim 22 wherein the color contrast adjuster determines the at least one text object color and background object color.

27. The apparatus of claim 22 wherein the color contrast adjuster provides a user with at least one example color combination for the at least one text object and the background object, allows the user to choose an example color combination from the at least one example color combination, adds any chosen example color combination to the user preferences, and adds the current color combination to the plurality of problem color combinations, the current color combination corresponding to the chosen example color combination.

28. The apparatus of claim 22 wherein the at least one background object color is a plurality of colors and wherein the color contrast adjuster selects the specific color combination by combining each of the plurality of background object colors with the text object color to create a plurality of current color combinations and by comparing the plurality of current color combinations with the plurality of problem color combinations.

29. The apparatus of claim 28 wherein there is more than one match between the plurality of current color combinations and the plurality of problem color combinations, and wherein the specific color combination selected and applied by the color contrast adjuster is a default color combination.

30. The apparatus of claim 28 wherein the background object comprises a plurality of pixels, each pixel having a pixel color, and wherein the color contrast adjuster categorizes and weights each pixel's color.

31. The apparatus of claim 30 wherein the background object has a diagonal and wherein the weight assigned to a pixel's color is determined by one minus the fraction of the distance from that pixel to the nearest part of the text object divided by the length of the diagonal.

32. The apparatus of claim 30 wherein the weight is one.

33. The apparatus of claim 22 wherein the at least one text object is a plurality of text objects such that there are a plurality of current color combinations and wherein the color contrast adjuster compares each current color combination with the plurality of problem color combinations to select the specific preferred color combination.

34. The apparatus of claim 22 wherein the apparatus further comprises a cursor, wherein the color contrast adjuster saves the name of the color of the object whose color is changed in the current color combination when the color contrast adjuster applies the specific color combination to the at-least one text object and the background object, and wherein the color contrast adjuster displays the name of the color when the cursor is placed over the object whose color is changed.

35. The apparatus of claim 22 wherein the browser comprises at least one data structure that comprises the text object color and the at least one background object color, and wherein the color contrast adjuster applies the specific color combination by modifying the text object color and the at least one background object color in the at least one data structure to the specific color combination.

* * * * *